United States Patent [19]

Lewis

[11] E Patent Number: Re. 31,633

[45] Reissued Date of Patent: Jul. 24, 1984

[54] LUMBER CONDITIONING KILN

[76] Inventor: Donald C. Lewis, P.O. Box 1107, Bangor, Me. 04401

[21] Appl. No.: 443,539

[22] Filed: Nov. 22, 1982

Related U.S. Patent Documents

Reissue of:

[64] Patent No.: 4,250,629
Issued: Feb. 17, 1981
Appl. No.: 13,059
Filed: Feb. 21, 1979

[51] Int. Cl.[3] ..... F26B 3/06

[52] U.S. Cl. ..... 34/13.8; 34/26; 34/46; 34/77

[58] Field of Search ..... 34/12, 13.4, 13.8, 16.5, 34/26, 27, 46, 77, 219, 223

[56] References Cited

U.S. PATENT DOCUMENTS

| | | | |
|---|---|---|---|
| 1,339,374 | 5/1920 | Buensod | 34/46 X |
| 1,467,306 | 9/1923 | Carrier | 34/46 X |
| 1,497,362 | 6/1924 | Dhé | 34/13.8 |
| 2,318,027 | 5/1943 | Sykes et al. | 34/46 X |
| 2,920,398 | 1/1960 | Liljenström | 34/46 |
| 3,337,967 | 8/1967 | Smith | 34/46 |
| 3,940,860 | 3/1976 | Unterreiner | 34/46 |

FOREIGN PATENT DOCUMENTS

| | | | |
|---|---|---|---|
| 2437372 | 2/1975 | Fed. Rep. of Germany | 34/13.8 |
| 1533651 | 11/1978 | United Kingdom | 34/13.4 |

*Primary Examiner*—Albert J. Makay
*Assistant Examiner*—Harold Joyce
*Attorney, Agent, or Firm*—Robert T. Gammons

[57] ABSTRACT

A lumber conditioning kiln comprising an enclosure defining a closed chamber for receiving a stack of lumber so positioned as to provide space at the top and at the ends, a dehumidifier in said chamber containing an evaporator, said dehumidifier defining a flow path through the evaporator and a bypass passage around the evaporator, a blower for inducing air flow into the flow path of the dehumidifier for dehumidifying air and discharging dry air therefrom, fans for effecting a circulation of air within the chamber in a direction such that dry air from the dehumidifier is conducted across the top of the stack to the far end and from there reversely through the stack to the one end where the moisture-laden air from the stack is induced into the flow path of the dehumidifier and wherein there are dampers for reducing the air flow over the evaporator and increasing the air flow through the bypass.

21 Claims, 2 Drawing Figures

LUMBER CONDITIONING KILN

Figure 1:
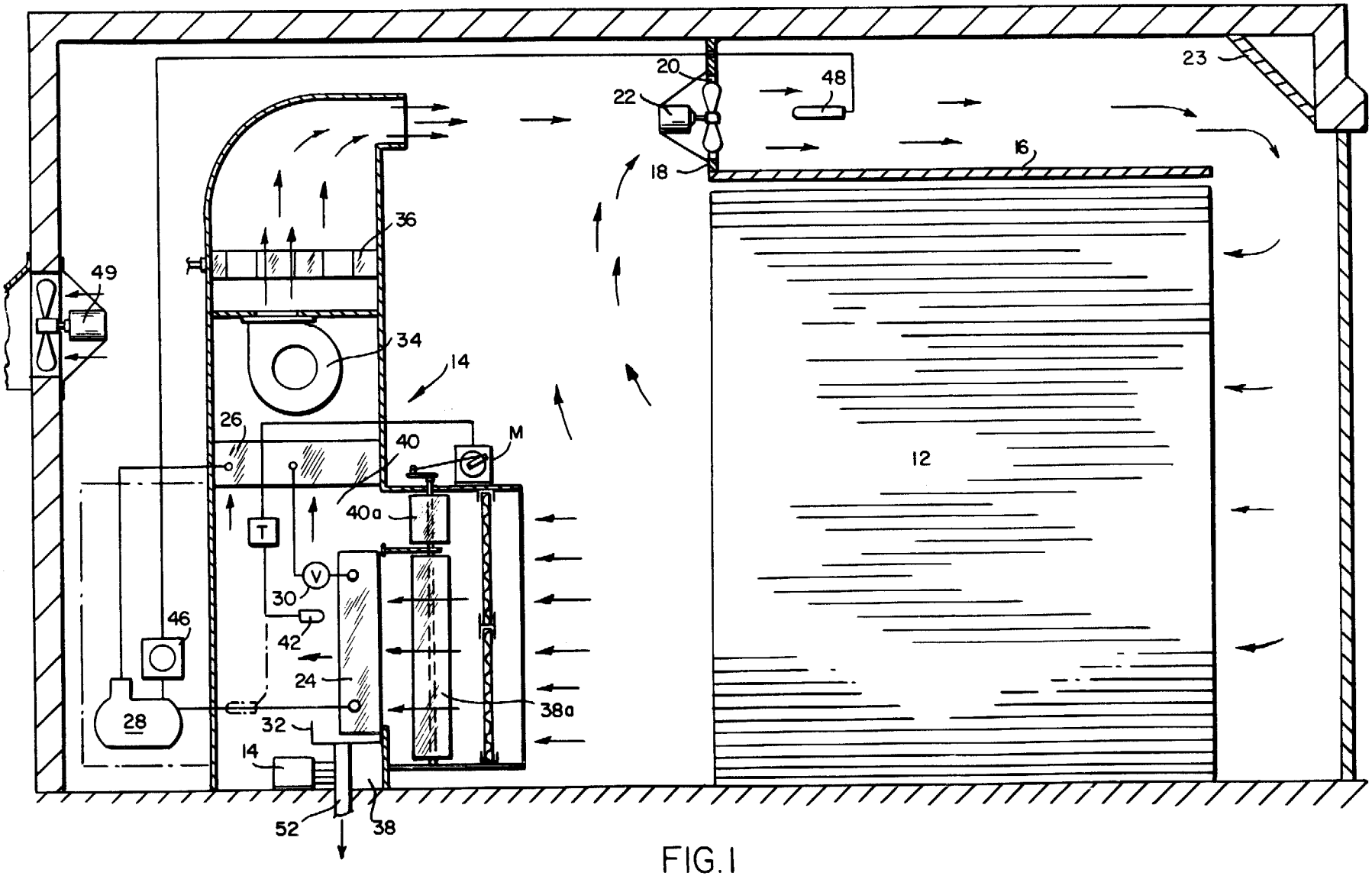

Matter enclosed in heavy brackets [ ] appears in the original patent but forms no part of this reissue specification; matter printed in italics indicates the additions made by reissue.

BACKGROUND OF INVENTION

This invention relates to a process for kiln drying wood. In known processes, air is circulated through the stacked wood in a kiln chamber. The temperature and humidity of the air in the kiln are controlled in accordance with established kiln schedules which have been developed for various sizes, conditions and types of wood. A typical schedule, taken from the U.S. Department of Agriculture Handbook #[133] *188*, DRY KILN OPERATOR'S MANUAL, for Eastern White Pine is shown below:

| Moisture content of wood at start of step (in %) | Dry Bulb Air Temperature (in °F.) | Wet Bulb Air Temperature (in °F.) |
|---|---|---|
| Above 60% | 130 | 115 |
| 60 | 130 | 110 |
| 50 | 130 | 105 |
| 40 | 130 | 100 |
| 35 | 130 | 95 |
| 30 | 140 | 105 |
| 25 | 150 | 115 |
| 20 | 160 | 125 |
| 15 | 160 | can vary |

Schedules such as the one shown above when closely followed can result in good quality wood being dried in a reasonably fast time with little or no damage. The schedule shown above would take about one week to complete. The temperature is normally expressed in °F. or °C. and the moisture content of the air is usually expressed in °F. or °C. on a wet bulb thermometer. The moisture content may also be expressed in some other manner, such as relative humidity, dewpoint, moisture ratio, etc.

There are several known processes for controlling the temperature and humidity of the air in the kiln. This invention relates to the dehumidification process. The prior art dehumidification systems do not have the ability to operate over a wide range of temperature as shown in the typical schedule above. This invention allows a dehumidification system to operate at any temperature between approximately 70° F. dry bulb and 160° F. dry bulb. The prior art dehumidifiers have been generally limited to a maximum operating temperature of approximately 120° F. If the temperature is limited to below 120° F., the drying process is much slower, the possibility of damage from mold and stain increases, and kiln operators are required to ignore the established kiln schedules. This invention allows the existing kiln schedules to be used with only minor modifications. It also allows a faster drying time because of the higher temperatures. Problems related to mold are also reduced.

A dehumidification system uses a conventional refrigeration cycle. In the known systems, air is drawn from the kiln chamber and it passes over a cooling coil. It is cooled and dehumidified and then the air passes over a heating coil where it is reheated. A fan is used to draw the air over these coils and then the air is returned to the kiln, heated and with the moisture removed. The cooling coil is an evaporator of a conventional refrigeration cycle. The heating coil is the condenser of a conventional refrigeration cycle and in the refrigeration system there is also a compressor.

In the prior art, the cooling coil, condenser coil and compressor are selected to operate within a certain range of temperatures. If the temperature increases beyond design selection range, the pressures that the compressor is required to maintain in the evaporator and in the condenser also increase and the resulting load would be beyond the design range for the compressor motor. Also, as the temperature of the air going across the cooling coil increases, the refrigerant leaving the cooling coil also increases in temperature. Since the refrigerant cools the compressor in most dehumidification systems, the warmer refrigerant may be unable to provide the cooling the compressor motor requires.

This invention has for its purpose to provide for operating over a wide range of temperatures, to increase the rate of drying thereby to reduce damage from mold and stain, to allow existing kiln schedules to be used with only minor modification and to vary the amount of air passing over the cooling unit of the dehumidifier in such a way as to prevent the compressor from being overloaded and from being overheated.

SUMMARY OF THE INVENTION

A kiln for drying lumber comprising means defining an enclosed chamber for receiving a stack of lumber with a space above the stack and at the ends, a dehumidifier in the chamber containing an evaporator, said dehumidifier defining a flow path through the evaporator and a bypass passage around the evaporator, means for inducing air flow into the flow path of the dehumidifier for dehumidifying air entering the dehumidifier and discharging dry air therefrom, means for effecting a circulation of air within the chamber in a direction such that dry air from the dehumidifier is conducted across the top of the stack to the far end and from thence reversely through the stack to the one end and wherein moisture-laden air from the stack is induced into the flow path of the dehumidifier and means for decreasing the air flow over the evaporator and correspondingly increasing the flow through the bypass passage. There is a thermostat positioned to sense the temperature of the evaporator and means operable by the thermostat to effect actuation of the means for decreasing the flow of air over the evaporator and increasing the flow through the bypass passage. Optionally, the thermostat may be positioned to sense the temperature of the refrigerant flowing from the evaporator to the compressor. The means for decreasing the air flow over the evaporator may comprise a damper arranged to be closed when the temperature rises too high so as to bypass the air through the bypass passage or a damper in the bypass passage for increasing the flow through the bypass passage when the temperature rises too high. Alternatively, the aforesaid means may comprise a primary damper positioned in the flow path of the air to the evaporator and a secondary damper in the bypass passage through which air is diverted from the evaporator when the primary damper is closed. When there are primary and secondary dampers, the means for effecting the decrease in air flow over the evaporator and the corresponding increase in the flow through the bypass passage operates simultaneously to close the primary damper and open the bypass damper.

A baffle coextensive with the top of the stack defines in conjunction with the top of the chamber a flow path. The dehumidifier is spaced from the end of the stack adjacent thereto sufficiently so that a portion of the air leaving the stack at the one end is recirculated without passing through the dehumidifier. The means for effecting circulation of air in the chamber comprises a fan positioned at the top of the chamber at the entrance to the flow path at the one end and sensors positioned in the flow path of the air across the stack, said sensors operating in response to the temperature and moisture content of the air in the flow path, on the one hand, when there is insufficient moisture, to stop the dehumidifier and, on the other hand, when there is more than enough moisture to start the dehumidifier and when the temperature is excessive, to start an exhaust fan which exhausts air from the chamber and when the temperature is deficient, to stop the exhaust fan and start the supplemental heater in the dehumidifier.

There is a tray for collecting the condensate from the evaporator and means for supplying a portion of it to sensors, and a portion to an evaporator-type humidifier for restoring moisture to the stack after a drying cycle to raise the moisture content to a predetermined level.

Figure 2:
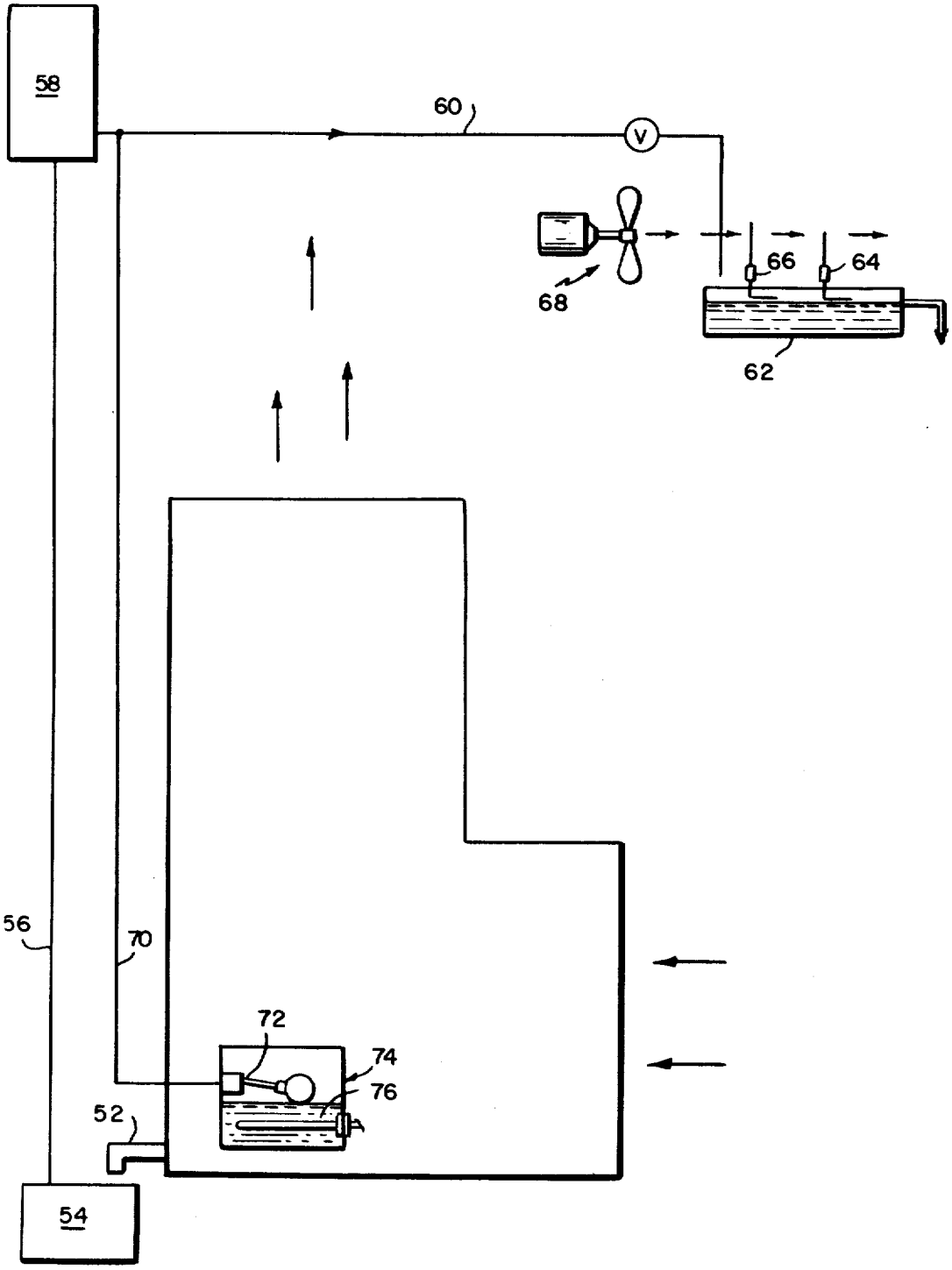

The invention will now be described in greater detail with reference to the accompanying drawings, wherein:

FIG. 1 is an elevation partly in section showing the kiln within which the lumber to be conditioned is stacked, a dehumidifier at one end of the chamber and the circulation set up within the chamber; and FIG. 2 diagrammatically illustrates an evaporator-type humidifier for restoring a predetermined amount of moisture following a drying cycle.

Referring to the drawings, the kiln comprises an enclosure 10 of suitable size to receive a stack of lumber 12 for conditioning with a space at one end between that and the adjacent end of the stack of lumber for receiving a dehumidifying unit 14.

The enclosure 10 as herein illustrated is of substantially rectangular, horizontal and vertical section and is provided near the top with a horizontally-disposed baffle 16 which defines with the underside of the top a flow passage across the top of the stack 12. At the end of the baffle adjacent the dehumidifying unit there is a vertical extension 18 containing an opening 20 within which is mounted a circulating fan or fans 22 for inducing air flow from the dehumidifying unit through the opening 20 into the passage above the baffle and forcing it to flow across the top of the baffle to the end of the chamber remote from the dehumidifying unit and from thence back to the one end of the chamber through the stack to the one end of the chamber within which the dehumidifying unit is situated and where a part of this air returned through the stack enters the dehumidifying unit and a part is returned to the flow path without passing through the dehumidifying unit. The air passing through the dehumidifying unit is dried, ejected from the top of the dehumidifying unit and, together with the untreated air, is recirculated by the fan 22. The circulation is depicted in FIG. 1 by the arrows shown thereon. A baffle 23 is positioned at the top of the chamber at the remote end to direct the air downwardly to the end of the stack. An exhaust fan 49 is provided in one wall of the chamber at the end within which the dehumidifier is located.

The dehumidifying unit is, for the most part, of conventional construction comprising a cooling coil or evaporator 24, a heating coil or condenser 26, a compressor 28 which withdraws refrigerant from the evaporator and supplies it to the condenser, and an expansion valve 30 connecting the condenser to the evaporator. A drain pan 32 supported below the evaporator provides for draining water from the condenser. Above the condenser, there is a blower 34 for drawing air into the dehumidifying unit at the base and discharging it from the top in line with the fan 22 which, in conjunction with the fan 22, provides for the circulation of the air. Above the blower 34, there is a supplemental heating coil 36 for reheating the dried air when necessary.

As herein illustrated, the dehumidifier unit defines a flow passage 38 through the evaporator and a bypass passage 40 around the evaporator. A primary damper 38a and a bypass damper 40a are mounted, respectively, in the passages 38,40 and so controlled that when the primary damper 38a is open, the bypass damper 40a is closed and vice versa. A damper motor M is provided and connected to the dampers by suitable kinematic linkage to effect opening and closing of the primary and bypass dampers in response to the temperature of either the evaporator 24 or the temperature of the refrigerant flowing from the evaporator to the compressor. Control of the motor M is had by means of a thermostat T provided with a sensor bulb 42 arranged in the path of the flow of air through the evaporator or, alternatively, arranged in the pipe 44 extending from the evaporator to the compressor.

A control system is thus provided by means of which the amount of air passing over the evaporator coil can be varied as the temperature increases. A sensor 42 located in the air path immediately leaving the evaporator coil provides for closing the damper over the evaporator coil and opening the bypass damper to maintain a constant temperature leaving the evaporator coil of approximately 60° F. The dampers are modulated to maintain temperature of the air approximately constant. The evaporation coil is [circulated] *circuited* so that the refrigerant leaving the evaporation coil is approximately the same as the air temperature. This provides refrigerant from the evaporation coil cool enough to cool the compressor motor and a constant pressure in the evaporator which prevents the compressor from being overloaded and overheated.

The controls that position the dampers can be proportioning, electric, pneumatic or electronic.

A controller 46 is provided for starting and stopping the compressor motor 28 and responds to sensor means 48 connected thereto by a line 50 which senses the condition of the air entering the passage above the stack which is comprised of dry air from the dehumidifying unit and the untreated air which bypasses the dehumidifying unit. The sensor means 48 comprises wet and dry bulb sensors. When the wet bulb indicates an excess of moisture in the air, it starts the dehumidifying cycle by starting the compressor motor. When the moisture is reduced to an acceptable level, the dehumidifying cycle is stopped by stopping the compressor motor. When the dry bulb sensor indicates an excess of temperature, it starts the exhaust fan 49. However, when the temperature decreases to an acceptable level, it stops the exhaust fan and starts the supplemental heater 36. A humidistat may be used in place of a wet bulb.

Optionally, the damper 40a may be omitted and the air flow controlled solely by the damper 38a. When so constructed, closing the damper 38a will divert the air through the bypass passage 40 so as to increase the flow through the bypass passage and simultaneously reduce or stop the flow through the flow passage 38. Alternately, the damper 38a may be omitted and the damper 40a in the bypass passage employed to control the flow, when open to promote an increased flow through the bypass passage to thus reduce flow through the flow path 38. In either instance, the damper or dampers may be automatically or manually operated.

In conjunction with the dehumidifying unit, there is provided a system to recover the water that is condensed from the air on the evaporator coil and using it to restore some moisture to the stack when conditions require it. This system is shown in FIG. 2 wherein a drainpipe 52 conducts water from the drain pan 32 of the dehumidifier into a condensate pump 54 which, in turn, pumps the condensate through a conductor 56 to a storage tank 58. Water from the storage tank is delivered by way of a conductor 60 and adjustable valve V1 to a trough 62 within which are situated a dry bulb and the wick of a wet bulb 64 and 66, respectively. A fan 68 maintains a circulation of air over the wick 66. In order to alleviate a too dry condition in the kiln, a conductor 70 connected to the bottom of the storage tank by way of a float valve 72 will supply water from the tank to an evaporator-type humidifier 74 located within the base of the dehumidifier through a float valve 72 and is heated there by an electric heater 76 whenever the humidity in the kiln is too low.

The system thus comprises circulating air through a stack of lumber so as to remove excess moisture therefrom, dehumidifying the moisture-laden air and recyling it. This provides certain advantages over the prior art in that it enables operating over wide ranges of temperature, increases the rate of drying, thereby reducing the damage from mold and stain, allows existing kiln schedules to be employed, and enables operating in such a way as to prevent the dehumidifying unit from being overloaded and/or overheated. Additionally, the system enables recovery of the water from the drying operation and using it in an evaporator-type humidifier to restore some of the moisture to the lumber following the drying operation to relieve stresses that are developed during the drying operation.

It should be understood that the present disclosure is for the purpose of illustration only and includes all modifications or improvements which fall within the scope of the appended claims.

What is claimed is:

1. In a kiln for drying lumber, means defining an enclosed chamber for receiving a stack of lumber with a space above and at the ends of the stack, dehumidifying means in the chamber including a condenser, an evaporator and a compressor, means defining an enclosure in the chamber within which the condenser and evaporator are contained, said enclosure being provided with intake and outlet openings through which moist air from the stack enters the enclosure and dehumidified air leaves the enclosure, said evaporator preceding the condenser in the flow path of the air passing through the enclosure, said condenser being so positioned in the enclosure that all of the air entering the enclosure must pass through the condenser, means situated in the enclosure beyond the condenser in the direction of flow for inducing flow through the enclosure, damper means situated in the enclosure preceding the evaporator, the position of which may be controlled to control the flow of air entering the enclosure through the evaporator to maintain the temperature of the evaporator at a predetermined level and, hence, the load on the compressor and means for automatically changing the position of the damper means in response to temperature sensing means positioned in the path of the air leaving the evaporator.

2. A kiln for drying lumber according to claim 1 wherein there are fans arranged at one end of the stack for inducing circulation of air from the one end across the top of the stack to the other end and from thence through the stack to the one end.

3. A kiln according to claim 1 comprising means defining a bypass for bypassing part of the air entering the inlet opening around the evaporator.

4. A kiln according to claim 3 wherein the means for bypassing part of the air comprises a bypass passage and a damper positioned in the flow path of the bypass passage.

5. A kiln according to claim 1 comprising means for bypassing the air comprising a bypass passage, a bypass damper positioned in the bypass passage and means for effecting actuation of the bypass damper which simultaneously closes said damper means and opens the bypass damper.

6. A kiln according to claim 1 wherein the space above the stack defines a flow path across the top and wherein the dehumidifier is spaced from the end of the stack adjacent thereto sufficiently so that some of the moisture-laden air leaving the stack at that end re-enters the flow path of the air from the dehumidifier without passing through the dehumidifier.

7. A kiln for drying lumber according to claim 6 comprising sensors in the flow passage across the top of the stack.

8. A kiln for drying lumber according to claim 7 comprising a controller connected to the sensors and to the compressor to effect operation of the latter in response to said sensors.

9. A kiln for drying lumber according to claim 6 comprising dry and wet bulb sensors in the flow passage across the top of the stack.

10. A kiln for drying lumber according to claim 6 comprising relative humidity and dry bulb sensors in the flow passage across the top of the stack.

11. A kiln according to claim 1 wherein there is an exhaust fan in the chamber and a supplemental heater in the dehumidifier for heating the dehumidified air before it is discharged and the means for circulating the air comprises fans positioned above the stack at the one end and/or humidistat and dry bulb sensors positioned in the path of the air flowing across the top of the stack, said sensors operating in response to the temperature and moisture content of the air flowing across the top of the stack to, on the one hand, when there is insufficient moisture, stop the dehumidifier unit and, on the other hand, when there is more than enough moisture, to start the dehumidifier unit, and when the temperature is excessive, to start an exhaust fan and when the temperature is deficient, to stop the exhaust fan and start the supplemental heater.

12. A kiln for drying lumber according to claim 1 comprising a baffle at the top of the enclosure above the stack parallel to and spaced from the top which defines a flow passage across the top of the stack from one end of the stack to the other end thereof.

13. A kiln according to claim 1 wherein the means for controlling the damper means comprises a motor and kinematic means connecting the motor to the damper means.

14. A kiln according to claim 1 comprising a controller connected to the sensor and to the compressor operable in response to the sensor to start and stop the compressor.

15. The method of conditioning lumber comprising within a closed chamber within which is a stack of lumber, circulating air in a predetermined path which commences at one end of the chamber, passes across the top of the stack to the other end and returns through the stack to the one end, at the one end inducing a portion of the air returning through the stack into a dehumidifier in a flow path over the evaporator coil and controlling the flow of air entering the dehumidifier in the event that the refrigerant flowing from the evaporator to the compressor exceeds a predetermined level to bypass the air [and] *around* the evaporator.

*16. In a system for dehumidifying moisture-laden air which has been circulated through a material to be dried, a dehumidifier including a condenser, an evaporator, and a compressor, means defining an enclosure within which the condensor and evaporator are contained, said enclosure being provided with intake and outlet openings through which the moisture-laden air enters the enclosure and dehumidified air leaves the enclosure, said evaporator preceding the condenser in the flow path of air passing through the enclosure, said condenser being so positioned in the enclosure that all of the air entering the enclosure must pass through the condenser, means situated in the enclosure beyond the condenser in the direction of flow inducing flow through the enclosure, damper means situated in the enclosure preceding the evaporator, the position of which can be controlled to control the flow of air entering the enclosure through the evaporator to maintain the temperature of the evaporator at a predetermined level and, hence, the load on the compressor and means for automatically changing the position of the damper means in response to the condition of the cooling medium flowing from the evaporator to the compressor.*

*17. A system according to claim 16 wherein said last-named means is a temperature-sensing device located in the flow path of the air through the evaporator.*

*18. A system according to claim 16 wherein there is conductor means interconnecting the condensor, evaporator and compressor and said last-named means is a temperature-sensing device located in the conductor means through which cooling medium flows from the evaporator to the compressor.*

*19. A system for removing the moisture content of materials comprising means defining a closed chamber within which the material to be treated is positioned, a dehumidifier positioned in the chamber including a condenser, an evaporator, and a compressor, means defining an enclosure in the chamber within which the condenser and evaporator are contained, said enclosure being provided with intake and outlet openings, means for inducing a flow of air from the outlet opening of the enclosure through the material to be treated and back into the enclosure through the intake opening, said evaporator preceding the condenser in the flow path of the air passing through the enclosure, said condenser being so positioned in the enclosure that all of the air entering the enclosure must pass through the condenser, damper means situated in the enclosure preceding the evaporator, the position of which can be controlled to control the flow of air entering the enclosure through the evaporator to maintain the temperature of the evaporator at a predetermined level and, hence, the load on the compressor, and means for automatically controlling the position of the damper means in response to the condition of the cooling medium flowing from the evaporator to the compressor.*

*20. A system according to claim 19 wherein said last-named means is a temperature-sensing device located in the flow path of the air through the evaporator.*

*21. A system according to claim 19 wherein there is conductor means interconnecting the condenser, evaporator and compressor said last-named means is a temperature-sensing device located in the conductor means through which the cooling medium flows from the evaporator to the compressor.*

* * * * *